(12) United States Patent
Liljegren et al.

(10) Patent No.: US 9,537,394 B2
(45) Date of Patent: Jan. 3, 2017

(54) SWITCH PROTECTION I AUXILIARY RESONANT CIRCUIT

(71) Applicant: COMSYS AB, Lund (SE)

(72) Inventors: Dan Liljegren, Lund (SE); Oscar Haraldsson, Lund (SE)

(73) Assignee: COMSYS AB, Lund (SE)

( * ) Notice: Subject to any disclaimer, the term of this patent is extended or adjusted under 35 U.S.C. 154(b) by 0 days.

(21) Appl. No.: 14/413,113

(22) PCT Filed: Jul. 3, 2013

(86) PCT No.: PCT/SE2013/050857
§ 371 (c)(1),
(2) Date: Jan. 6, 2015

(87) PCT Pub. No.: WO2014/007746
PCT Pub. Date: Jan. 9, 2014

(65) Prior Publication Data
US 2015/0207408 A1    Jul. 23, 2015

Related U.S. Application Data

(60) Provisional application No. 61/676,037, filed on Jul. 26, 2012, provisional application No. 61/676,061, filed on Jul. 26, 2012.

(30) Foreign Application Priority Data

Jul. 6, 2012   (SE) ...................................... 1250798

(51) Int. Cl.
*H02M 3/158*   (2006.01)
*H02M 3/325*   (2006.01)
(Continued)

(52) U.S. Cl.
CPC ............... *H02M 3/158* (2013.01); *H02M 1/14* (2013.01); *H02M 3/325* (2013.01); *H02M 7/36* (2013.01);
(Continued)

(58) Field of Classification Search
CPC ..................................................... H02M 3/158
(Continued)

(56) References Cited

U.S. PATENT DOCUMENTS

| | | |
|---|---|---|
| 5,047,913 A | 9/1991 | De Doncker et al. |
| 6,385,028 B1 * | 5/2002 | Kouno ................ H01L 27/0629 257/E27.016 |

(Continued)

OTHER PUBLICATIONS

International Search Report from PCT/SE2013/050857 mailed Oct. 14, 2013.

(Continued)

*Primary Examiner* — Matthew Nguyen
*Assistant Examiner* — Trinh Dang
(74) *Attorney, Agent, or Firm* — Calfee, Halter & Griswold, LLP

(57) ABSTRACT

A resonant power converter comprising electrical safety components comprising a combination of a diodes and a zener diodes coupled between DC conductors and an auxiliary switching circuit, the diodes being adapted to hinder the current from flowing from the auxiliary switching circuit to the negative DC conductor, and the zener diodes being adapted to allow current to flow from the negative DC conductor to the auxiliary switching circuit when the potential difference between the negative DC conductor and the phase conductor is above a threshold voltage. The Zener diodes being selected such that the threshold voltage of the Zener diodes is below the maximum blocking voltage of the transistors.

11 Claims, 6 Drawing Sheets

(51) Int. Cl.
*H02M 7/36* (2006.01)
*H02M 7/75* (2006.01)
*H02M 7/48* (2007.01)
*H02M 1/14* (2006.01)

(52) U.S. Cl.
CPC ............... *H02M 7/48* (2013.01); *H02M 7/75* (2013.01); *H02M 2007/4811* (2013.01); *H02M 2007/4815* (2013.01); *Y02B 70/1441* (2013.01)

(58) Field of Classification Search
USPC .................................. 323/271; 363/131, 132
See application file for complete search history.

(56) References Cited

U.S. PATENT DOCUMENTS

| | | | | |
|---|---|---|---|---|
| 6,459,213 B1* | 10/2002 | Nilssen | ............ | H02M 7/53832 315/209 R |
| 2004/0240240 A1* | 12/2004 | Bijlenga | ............ | H02M 7/4826 363/56.12 |
| 2009/0231081 A1* | 9/2009 | Ikriannikov | ............. | H01F 3/14 336/222 |
| 2011/0299208 A1* | 12/2011 | Suzuki | ................ | H01L 23/4006 361/91.5 |

OTHER PUBLICATIONS

Osughi M et al., "The Analyses of ZVS Turn-Off Loss and the New Snubber Circuit for TEH ARCP Inverter," Industrial Electronics, Control and Instrumentation, Sep. 5, 1994-Sep. 9, 1994, vol. 1, pp. 316-221.

Pfisterer H.-J., et al., "A Superconducting Magnetic Energy Storage System (SMES) for the Improvemnet of Power Quality," Magnetics Conference, 2000. Intermag 2000 Digest of Technical Papers, 2000 IEEE International Apr. 9-13, 2000, IEEE, Apr. 9, 2000, pp. 341.

Thelen R. F. et al., "A-2 MW Motor and ARCP Drive for High-Speed Flywheel," Twenty Second Annual IEEE Applied Power Electronics Conference, APEC 2007, Feb. 1, 2007, IEEE, Pi, pp. 1690-1694.

* cited by examiner

SWITCH PROTECTION I AUXILIARY RESONANT CIRCUIT

CROSS-REFERENCE TO RELATED APPLICATION

This application is the U.S. national phase entry of PCT/SE2013/050857, with an international filing date of 3 Jul. 2013, which claims the benefit of Sweden Application Serial No. 1250798-4, with a filing date of Jul. 6, 2012, U.S. Application No. 61/676,037 with a filing date of Jul. 26, 2012 and U.S. Application No. 61/676,061, with a filing date of Jul. 26, 2012, the entire disclosures of which are fully incorporated herein by reference.

TECHNICAL FIELD

The invention generally relates to power converters using resonance for limiting the power required for switching.

BACKGROUND

In power converters, losses appear as none of the components has ideal characteristics. The losses introduce heat in the power circuitry, which apart from consuming energy introduces thermal strain to all components, reducing their life span.

It is desirable to increase the frequency of operation of power converters as the generated output then can be more exactly controlled. Increasing the switching frequency leads to lower switching ripple, and smaller component values which in turn leads to a more compact, light-weight and cost-effective implementation of the invention. Further, lower switching ripple allows for potentially lowered EMI, which aligns with the goal of a non-disturbing switch. Still further, having a high switching frequency allows for higher frequency currents to be generated by the power converter, widening the range of applications suitable for the converter.

However, increasing the frequency also increases switching losses, as most losses appear on switching cycle basis. Forcing the transistor to commutate while a current is flowing through it or when there is a potential difference over it, requires energy which must be supplied to the gate of the transistor. Thus, reducing the current through the transistor or the voltage thereover reduces the total power input for the switch and thus the total power input to the system.

One way of reducing the losses over a particular switch is to ad a resonant component to the circuitry in which a current is generated by an inductive element, by the discharge of a capacitor. A circuit employing this technique is known as a resonant converter, and the method of using resonance to facilitate commutation is known as soft switching. There are generally two types of soft-switching: low-voltage switching and low-current switching. Low-voltage switching involves minimizing the voltage or potential difference over the switch prior to commutation, whereas low-current switching involves minimizing the current through the switch prior to switching.

Generating less EMI noise is an important goal in its own right. In applications where the converter or inverter is connected directly to the grid, EMI noise can cause problems which are normally solved by employing EMC-filters. EMC-filters are placed in series with the converter, thereby handling the full current capacity. By minimizing the EMI, EMC filters can be eliminated from the converter design.

One soft switching solution is provided in U.S. Pat. No. 5,047,913 (to De Doncker et al.). De Doncker suggests using controlled switches in the resonant auxiliary circuitry for overcoming the problem of active device switching losses in power converters. The reduction of losses in the power converters enables operation at higher switching frequencies. De Doncker describes that the resonant output voltage may fall short of the opposite rail voltage due to component resistances, device conduction losses and inadequate forcing potential. As a result, the next switching device in the inverter pole to be turned on may be switched at the peak of the resonating voltage, and hence must absorb some switching losses due to the non-zero voltage turn-on, including the energy dump from the parallel capacitor.

The introduction of an auxiliary switch reduces the resistance that the main switches are facing at commutation, and thereby the losses in the switch. However, the transistor elements of the auxiliary switch still need to commutate with a potential difference thereacross. The insulating capabilities of the gate oxide, which is a thin insulating layer separating the gate from the underlying source and drain, provides the commutation resistance that the gate signal needs to affect to force the transistor to commutate. In a switch based power converter, the accuracy of the output current is dependent on the frequency of the switching, which means that a high switching frequency is advantageous. As a switch with high switching frequency and small losses is desired, a transistor that commutates with small gate signal should be provided, as the energy of the gate signal becomes losses in the form of heat developed in the transistor. For achieving these properties, the oxide layer is made very thin, which reduces the required amount of energy that the gate signal needs to supply for forcing the transistor to commutate.

A transistor has a maximum blocking voltage, i.e. the voltage the transistor will reliably withstand without breakdown when in the off-state. The maximum blocking voltage depends on the gate oxide. When the maximum blocking voltage is exceeded, there is a risk that the gate oxide fails and thus loses its insulating capabilities. This failure is known as oxide breakdown. The risk of oxide breakdown increases as the oxide layers are made thinner. One form of oxide breakdown is oxide rupture which is caused by a high voltage being applied across the oxide layer. The high voltage causes the thinnest spot in the oxide layer to exhibit dielectric breakdown and thus allow current to flow. The flowing current causes the oxide layer to heat up, which further enables current flow through the oxide layer causing a chain reaction eventually causing a meltdown of the semiconductor material and thus a short circuit in the transistor. It would therefore be advantageous to provide a circuit for a power converter which reduces the risk that the potential difference over the transistor element exceeds the maximum blocking voltage of the transistor.

SUMMARY

A resonant power converter is provided. The resonant power converter comprises a DC power source, a positive DC conductor, a negative DC conductor, a phase conductor, and a power converting unit coupled between the DC power source and the phase conductor. The power converting unit comprising a first switch coupled between the positive DC conductor and the phase conductor and a first diode connected in parallel with the first switch, a second switch coupled between the negative DC conductor and the phase conductor and a second diode connected in parallel with the second switch, and a resonant auxiliary switching circuit coupled between a feeding connection on the DC power source and the phase conductor. The resonant auxiliary switching circuit comprises at least one inductor coupled in series with control means, for controlling the resonant auxiliary switching circuit, and auxiliary diodes coupled in series with the control means.

The resonant power converter further comprises a first electrical safety component coupled between the positive DC conductor and the auxiliary switching circuit, the first electrical safety component being adapted to: hinder the current from flowing from the positive DC conductor to the phase conductor, and allow current to flow from the auxiliary switching circuit to the positive DC conductor when the potential difference between the positive DC conductor and the auxiliary switching circuit is above a threshold voltage. The power converter also comprises a second electrical safety component coupled between the negative DC conductor and the auxiliary switching circuit, the second electrical safety component being adapted to: hinder the current from flowing from the auxiliary switching circuit to the negative DC conductor, and allow current to flow from the negative DC conductor to the auxiliary switching circuit when the potential difference between the positive DC conductor and the phase conductor is above a threshold voltage.

The electrical safety components thus protect the auxiliary switching circuit from residual currents in the phase conductor, such that peak voltages in the phase conductor are transferred to the positive and negative conductors respectively. According to one embodiment, the first and second electrical safety components each comprises a combination of a diode and a Zener diode. The diode is adapted to hinder the current from flowing in one direction and the Zener diode is adapted to hinder current from flowing when the potential difference thereover is below the threshold voltage.

According to one embodiment, the control means are transistors, and the threshold for allowing the current to flow through the Zener diode is below the maximum blocking voltage of the transistors.

The safety components makes it possible to create a power converter with high accuracy due to a high switching frequency without introducing large losses as the gate oxide can be made thin as it does not need to withstand high voltage peaks. As the transistors do not have to block high voltages less heat is created in the circuit, which reduces the need for cooling. Transistors without the capability of withstanding high voltages can also be made cheaper, which is a further advantage with the addition of the safety components.

The threshold voltage could be between 5-50V, preferably between 10-25V.

According to one embodiment, the transistors are IGBT transistors capable of handling high switching frequencies. As the threshold voltage of the Zener diodes is adapted to the maximum blocking voltage of the transistors, which varies with transistor type, the Zener diodes needs to be adapted to the transistor type e.g. if the transistors are IGBTs, the Zener diodes needs to be adapted to the particular blocking voltage of IGBTs.

According to one embodiment, the inductor coupled in series with the control means is a non-linear inductor or a component having a linear and a non-linear component. The non-linear inductor may be an inductor comprising magnetic material adapted to become magnetically saturated after an amount of current has flowed through the inductor, the magnetic material may be an iron core of the inductor.

According to one embodiment, the non-linear inductor has inductance in its linear region in the range 1-10 μH, and according to one embodiment the non-linear inductor has inductance in its linear region in the range 3-7 μH.

According to one embodiment, the control means and the first and second electrical safety components are integrated in a single package, which reduces the length of the conductors and thus the EMI generated in the circuitry. The single package may further comprise cooling means, for cooling the electrical safety components.

According to one embodiment, the resonant power converter according to any of the embodiments is adapted for use in an active filter.

Please note that any embodiment or part of embodiment could be combined in any way.

BRIEF DESCRIPTION OF THE DRAWINGS

The invention is now described, by way of example, with reference to the accompanying drawing, in which.

DETAILED DESCRIPTION

The fundamentals of a power converter using resonant switching will now be described by means of an example, under reference to the accompanying drawings. It will be appreciated that the drawings are for illustration only and are not in any way restricting the scope.

In the following figures the power converter is illustrated for use in an active filter. However, this embodiment is only to be seen as an example of one use of the power converter. The inventive concept defined by the claim could be used in all applications in which a resonant power converter is needed, such as for example in a power transformer.

The power converter in an active filter creates a compensating current which compensates for loads in a power system creating harmonics. By reducing the harmonics in the electrical system the reactive effect produced is reduced and thus the over-all energy consumption is lowered. A further description of the details of an active filter could for example be found in U.S. Pat. No. 7,289,888 to Persson. The electrical system is illustrated in the following figures by an energy supplying unit 4, an energy consuming load 5 and a main conductor 3 for transferring energy from the energy supplying unit 4 to the energy consuming unit 5. The energy supplying unit 4 could for example be the power grid or a transformer reducing the voltage supplied from the main power grid. The energy consuming load 5 could for example be an electrical motor. The active filter further comprises an inductor L1 which transforms the pulses generated by the switches Gp, Gn to a continuous signal by opposing the changes in current through it by developing a voltage across the inductor proportional to the rate of change of the current in accordance with I=−LdU/dt. For an active filter configured for 100 A current the inductor typically is an inductor in the range 200-250 uH.

Figure 1:
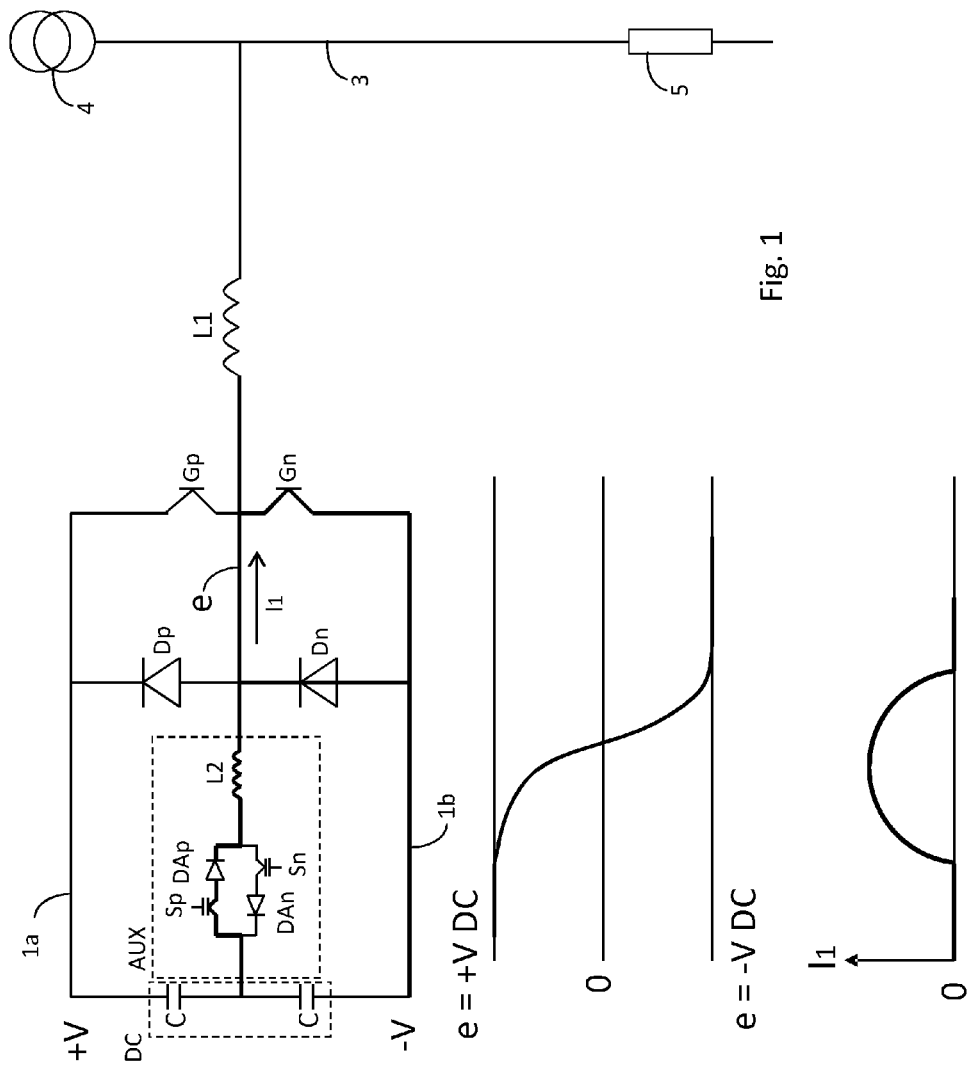
FIG. 1 shows a circuit for resonant switching, when the output current is switched from having the voltage +V to having the voltage −V.

FIG. 1 shows a circuitry for resonant power conversion. The resonant converter comprises two main switching devices Gp, Gn per phase. The switching devices have diodes Dp, Dn connected in parallel therewith. The resonant converter further comprises an auxiliary resonant commutation circuit AUX including auxiliary switching devices Sp, Sn, coupled in series with an inductor L2 and a feeding connection on the DC power source (DC). The DC power source is according to this embodiment two capacitors C. In the preferred embodiment, IGBTs are used for both the main switching device Gp, Gn and the auxiliary switching devices Sp, Sn, due to the high switching frequencies, but the invention is suitable for use with many types of switching devices, such as (but not limited to) BJTs, MOSFETs, MCTs, GTOs or IGCTs. FIG. 1 describes the operation of the resonant switch when no current is running through L1. In order to force the voltage from +V to −V, additional current needs to be supplied by the resonant circuitry. As a first step in the switching cycle, the switch Gp is turned off such that the current ceases to flow from the positive lead +V. The voltage in the phase conductor e is now the positive voltage +V and no current is flowing. The switch Sp is turned on closing the resonant circuit causing the capacitor C to discharge through the switch Sp and the diode DAp and thus altering the potential difference over the inductor L2, creating a current which is supplied to the phase conductor e. The resonant circuit thus supplies a forcing potential substantially equal to half the voltage difference between −V and +V. This causes the potential in the phase conductor e to go down towards −V at which time current stars to flow through the negative diode Dn. At this point, the potential difference over the negative switch Gn is reduced such that Gn can be switched without any voltage thereacross.

Figure 2:
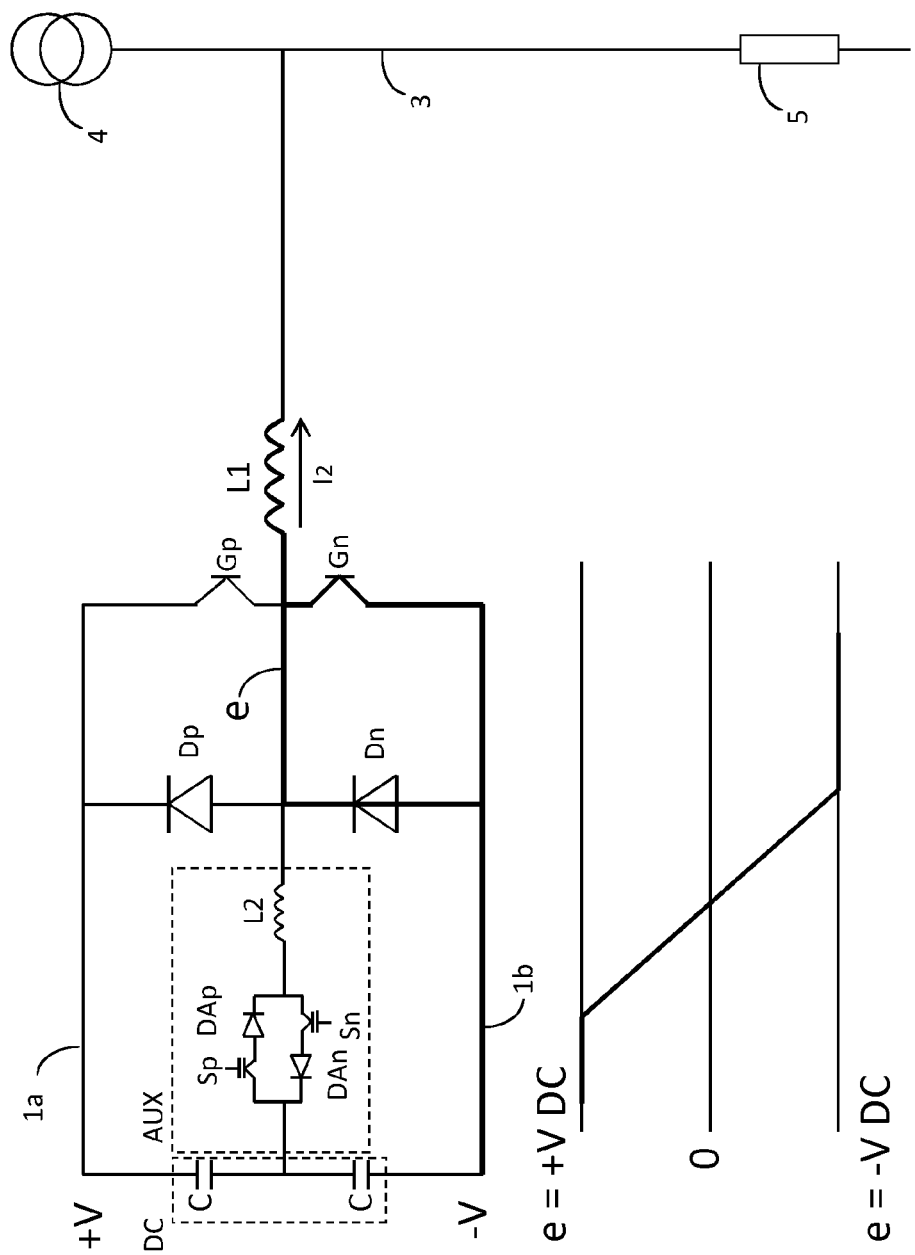
FIG. 2 shows a circuit for resonant switching, when the output current is switched from having the voltage +V to having the voltage −V.

FIG. 2 shows a second alternative in which the object is to switch from +V to −V when a current is flowing through L1. The positive switch Gp is turned off, however, as L1 holds a magnetic field it will continue to drive a current I2 therethrough from the diode Dn causing the voltage in the main lead to drop from +V to −V thus reducing the voltage difference over switch Gn such that the switch Gn can be switched with very small losses.

Figure 3:
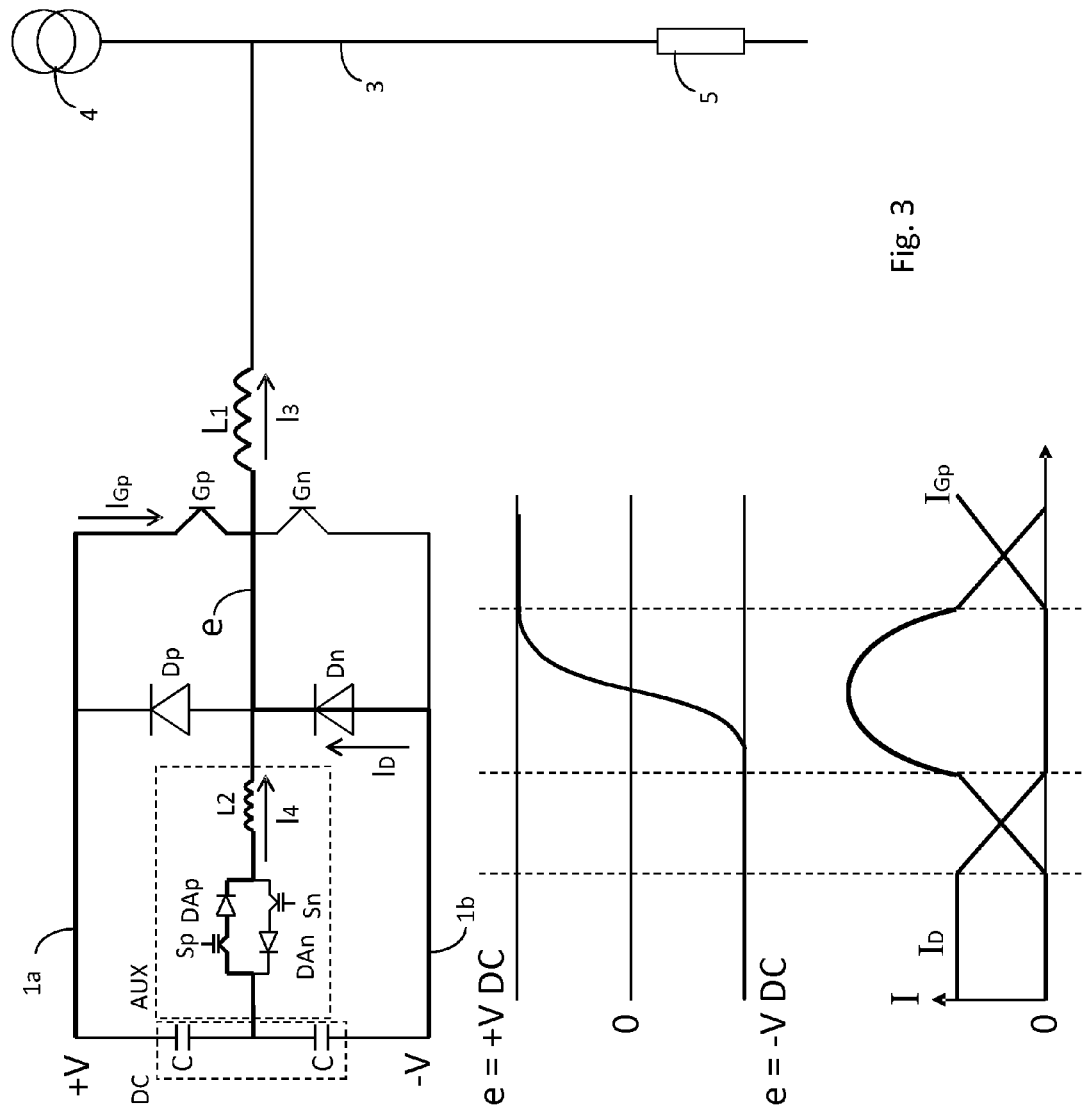
FIG. 3 shows a circuit for resonant switching, when the output current is switched from having the voltage −V to having the voltage +V.

FIG. 3 shows a third switching operation in which switching is performed from −V to +V when a current is flowing through the inductor L1. As a first step, the negative switch Gn is turned off causing a current I3 driven by the inductor L1 to continue to run through the negative diode Dn (denoted as diode current Id). Sp is turned on, closing the auxiliary circuit AUX discharging C and driving an auxiliary current I4 by means of L2, causing the voltage to rise in the main lead and thus lowering the voltage difference over Gp. When the voltage over Gp is approaching zero, Gp is turned on and the current IGp starts to flow through Gp and Sp is turned off.

Figure 4:
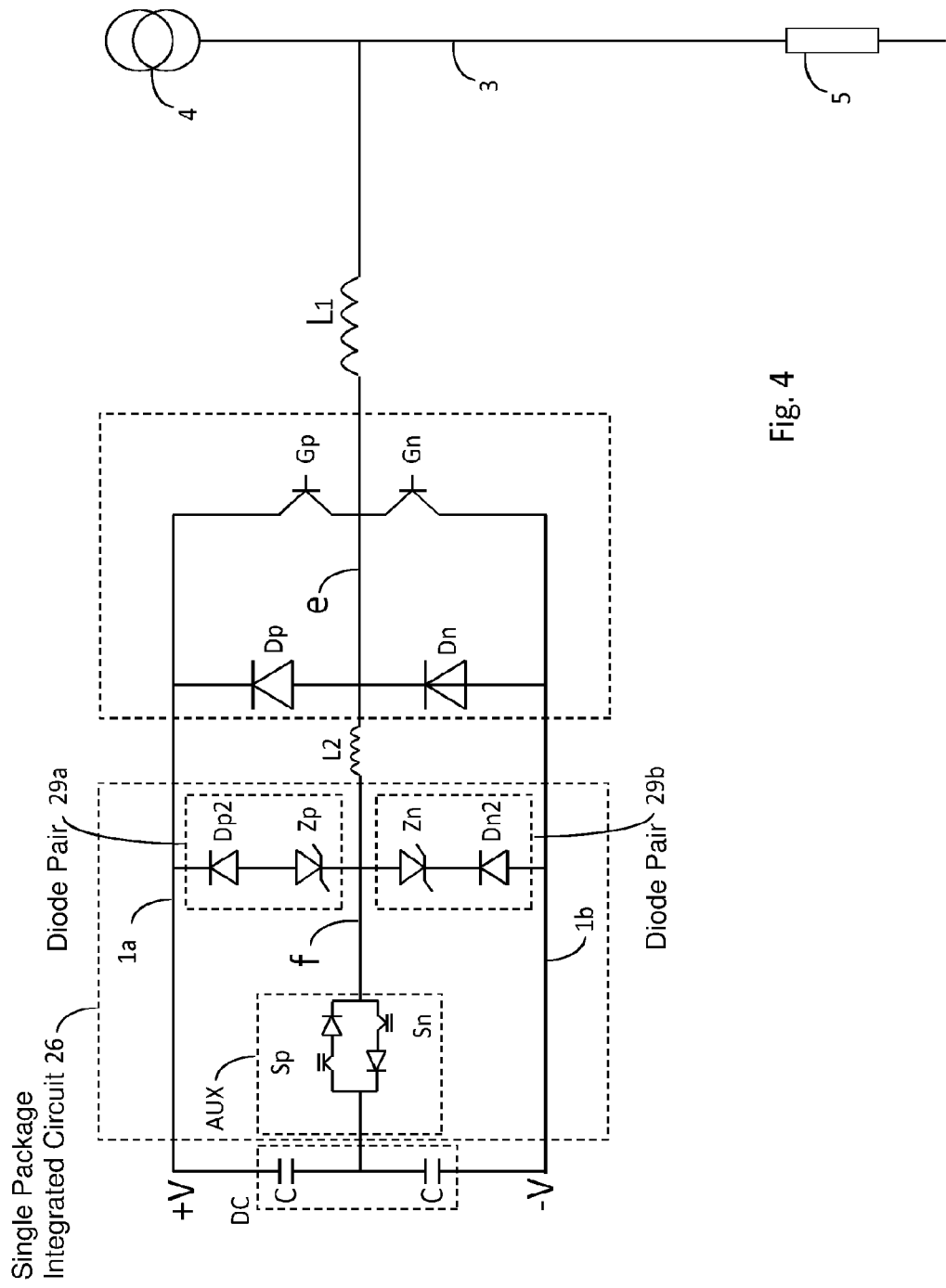
FIG. 4 shows a circuit for resonant switching, when the output current is switched from having the voltage −V to having the voltage +V, when a first and second electrical safety component is provided comprising Zener diodes.
Figure 4A:
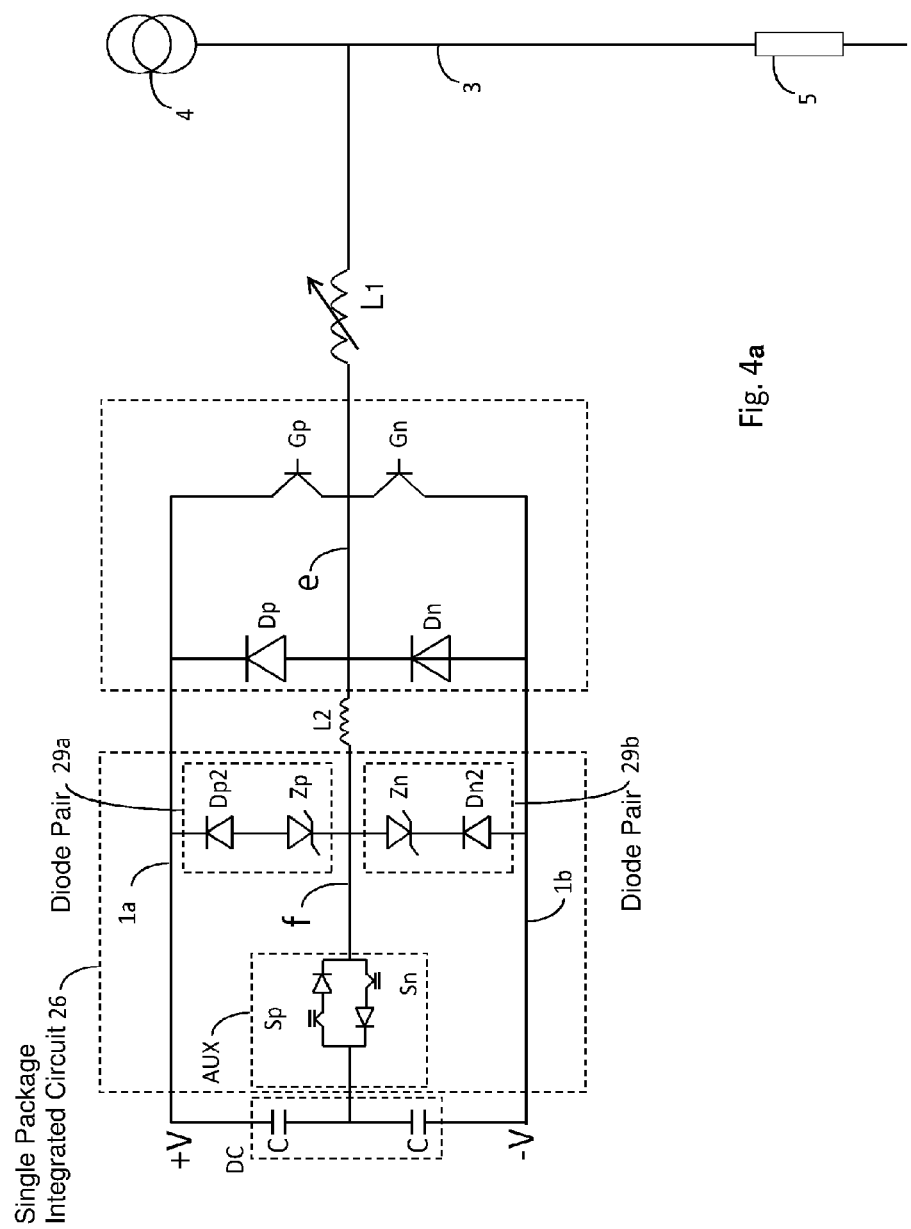
Figure 4B:
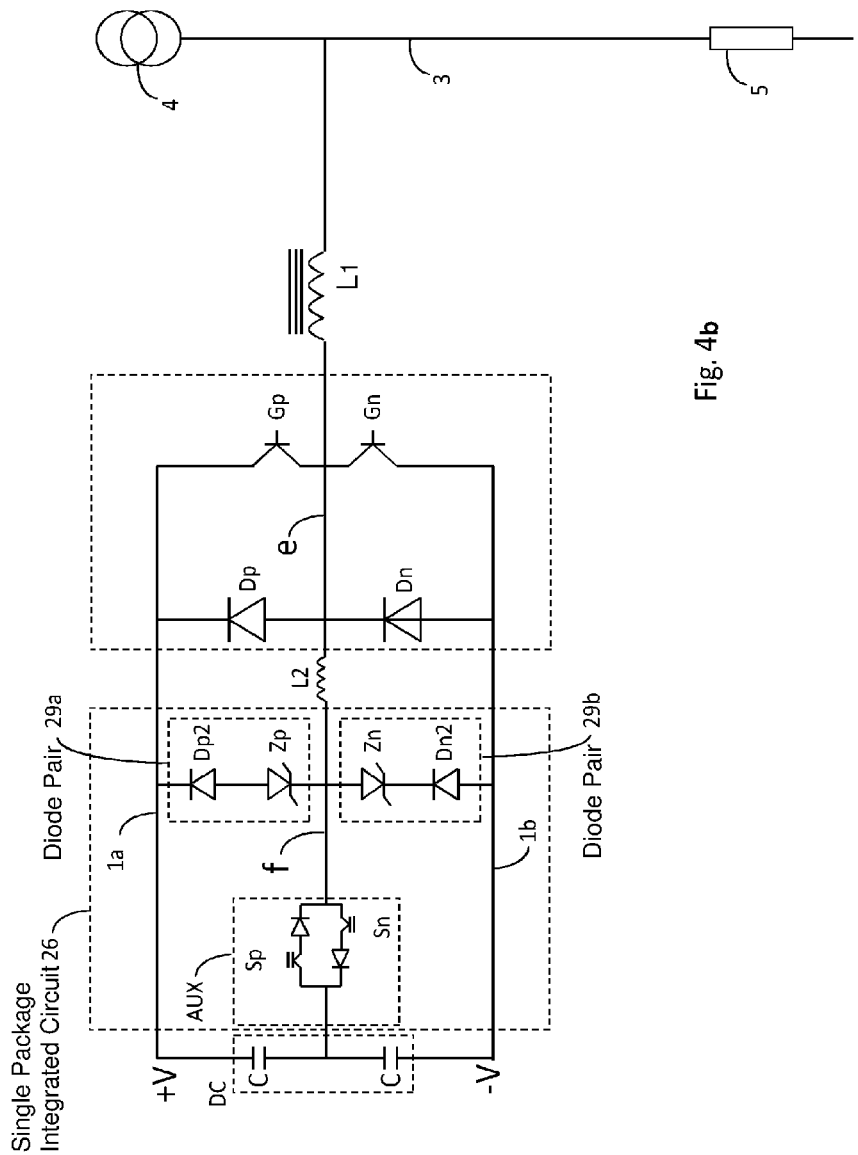

FIG. 4 shows an embodiment of the circuitry of a resonant power converter similar to the embodiments described under reference to FIGS. 1-3. The power converter shown in FIG. 4 additionally comprises electrical safety components 29a, 29b comprising safety diodes Dp2, Zp, Dn2, Zn, adapted to protect the AUX switch from residual currents in the phase conductor e, such that positive and negative peak voltages in the phase conductor e are transferred to the positive and negative conductor 10a, 10b, respectively, such that they do not place a large strain on the components of the AUX-switch. The diode Dp2 hinders current from flowing from the positive conductor 1a to the phase conductor e and analogue to that, the diode Dn2 hinders current from flowing from the negative conductor 1b to the phase conductor e.

In series with the diode Dp2, a Zener diode Zp is coupled. Zener diodes (or avalanche diodes) are diodes that allows current to flow freely in the forward direction and also in the reverse direction when the voltage is above a certain value. This value is known as the breakdown voltage, "Zener knee voltage" or "Zener voltage." Basically all diodes have a breakdown voltage, however, a Zener diode is specially designed so as to have a greatly reduced breakdown voltage, the so-called Zener voltage. A Zener diode will exhibit a controlled breakdown and allow current to keep the voltage across the Zener diode close to the Zener breakdown voltage. In the embodiment shown in FIG. 4 the Zener diode has a breakdown voltage of 15V such that the voltage in the phase conductor e will not exceed the voltage in the positive conductor by more than 15V. Analogue to the positive Zener diode Zp, a negative Zener diode Zn is provided having the same breakdown voltage of 15V. The negative Zener diode Zn ensures that the voltage in the phase conductor e will not be less than 15V below the voltage of the negative conductor 1b. As the breakdown voltage of the Zener diode is lower than the maximum blocking voltage of the transistors of the auxiliary switch, the safety diodes Dp2, Zp, Dn2, Zn will conduct all potentially harmful currents from the auxiliary phase conductor f to the positive and negative conductors respectively.

When the diode DAp (analogous for DAn) in the auxiliary switch AUX, is switched from the conducting state to a non-conducting state it has an intrinsic recovery time due to the charge carriers stored in the diode DAp. During this recovery time, the diode DAp can conduct in the reverse direction as the diode does not attain its blocking capability until the charge in the junction is depleted. This causes current to flow in the reverse direction through the auxiliary phase conductor f and through the diode DAp. This time is known as the reverse recovery time and is typically in the range 10-1000 ns. The reverse recovery current flowing in the auxiliary phase conductor f will cause a voltage build-up in the inductor L2 as it opposes the abrupt stop in the current flowing in the auxiliary phase conductor f. The voltage build-up in the auxiliary phase conductor f may rise to levels which may exceed the maximum blocking voltage of the transistors in the auxiliary switch AUX and thereby damage the auxiliary switch AUX. In the circuit as disclosed with reference to FIG. 4, voltages exceeding the breakdown voltage of the positive Zener diode Zp, e.g. 400V in the positive conductor 1a +15V breakdown voltage of the Zener diode Zp, i.e. 415V, or being below the breakdown voltage of the negative Zener diode Zn, e.g. −400V in the negative conductor 1b −15V breakdown voltage of the Zener diode Zn, i.e. −415V, will be lead to the positive and negative conductor, respectively. As the maximum blocking voltage of the transistors in the auxiliary switch AUX is higher than 15V no residual voltages, which may be harmful to the transistors of the auxiliary switch AUX, remains in the circuit. Zener diodes are further advantageous as they breaks down very rapidly and thus immediately conducts the reverse recovery current and thus to a large extent eliminates the build-up of a high voltage in the auxiliary phase conductor f. As the reverse recovery current is immediately conducted through the Zener diodes, the reverse recovery current does not lead to the build-up of harmonics generating EMI, thus the implementation of the circuitry with the Zener diodes effectively reduces EMI. As the Zener diodes conduct large currents, heat is generated in the Zener diodes, which may require the Zener diodes are cooled not to be damaged by the increase in temperature.

The two diode pairs 29a, 29b comprising the diodes Dp2, Dn2 and the Zener diodes Zp and Zn is according to the embodiment shown in FIG. 4 comprised in the same package 26 as the Auxiliary switch AUX. As the power converter according to the embodiments disclosed herein is adapted to be operated at relatively high frequencies, e.g. 400-500 KHz, the conductors of the circuitry creates inductors which in turn resonates with the capacitive components of the circuitry. By providing the components as an IC circuit in the same package 26 components can be miniaturized making the conductors of the circuit as short as possible, which enables optimization of the component selection reducing induced inductance and EMI noise in the circuit. Also, in automated IC manufacturing, the positioning and the selection of the components can be made with greater precision.

The auxiliary inductor L2 may be a non-linear inductor having an inductance being a function of the applied current. The non-linear inductor may be based on saturation of a magnetic material, such as the iron core of the inductor. The iron core is magnetized by the build-up of the magnetic field of the inductor from the current passing through the windings of the coil. The saturation of the iron core makes the resulting inductance a function of the applied current. When the auxiliary switching device Sp closes and causes a current to flow from the capacitor C through the auxiliary switch AUX, the inductor becomes saturated which means that the reactive component is eliminated and further build-up of harmonics in the circuitry is reduced. The reverse recovery current in this example is below the saturation current and the inductor L2 thus operates in its linear region damping the current and thus reducing the reverse recovery current flowing through the auxiliary switch AUX. The result is that the derivative of the reverse recovery current will be smaller in the region where the inductor L2 is active. As the derivative of the reverse recovery current will be smaller the total reverse recovery charge that needs to be forced from the diode will be smaller. Furthermore the oscillations of the current supplied to the phase conductor from the DC power supply will be smaller resulting in a more stable compensating current from the switch. A circuit which includes the non-linear inductor L2 and the safety components 29a, 29b will both efficiently dampen and lead away currents having a voltage exceeding the maximum blocking voltage of the transistors and dampen residual currents and reverse recovery currents which do not have a voltage exceeding the maximum blocking voltage of the transistors Sp, Sn. As a result, the circuit will generate a very low amount of EMI and have a prolonged life span.

Please note that the embodiments described herein are not limiting the scope of the invention, as the circuitry can be adapted in any way within the scope of the appended claims.

The invention claimed is:

1. A resonant power converter comprising:
    a DC power source,
    a positive DC conductor,
    a negative DC conductor,
    a phase conductor, and
    a power converting unit coupled between the DC power source and the phase conductor, the power converting unit comprising:
        a first switch coupled between the positive DC conductor and the phase conductor and a first diode connected in parallel with the first switch,
        a second switch coupled between the negative DC conductor and the phase conductor and a second diode connected in parallel with the second switch, and
    a resonant auxiliary switching circuit coupled between a feeding connection on the DC power source and the phase conductor, the resonant auxiliary switching circuit comprising:
        at least one inductor coupled in series with transistors for controlling the resonant auxiliary switching circuit and auxiliary diodes coupled in series with the transistors,
        a first electrical safety component comprising a combination of a diode and a Zener diode coupled between the positive DC conductor and the auxiliary switching circuit, the diode being adapted to hinder a current from flowing from the auxiliary switching circuit to the negative DC conductor, and the Zener diode being adapted to allow a current to flow from the positive DC conductor to the auxiliary switching circuit when a potential difference between the positive DC conductor and the phase conductor is above a first threshold voltage, and wherein the Zener diode is selected such that the first threshold voltage of the Zener diode is below the maximum blocking voltage of the transistors, and
        a second electrical safety component comprising a combination of a diode and a Zener diode coupled between the negative DC conductor and the auxiliary switching circuit, the diode being adapted to hinder a current from flowing from the auxiliary switching circuit to the negative DC conductor, and the Zener diode being adapted to allow a current to flow from the negative DC conductor to the auxiliary switching circuit when a potential difference between the negative DC conductor and the phase conductor is above a second threshold voltage, and wherein the Zener diode is selected such that the second threshold voltage of the Zener diode is below the maximum blocking voltage of the transistors.

2. The resonant power converter of claim 1, wherein the transistors are IGBT transistors.

3. The resonant power converter of claim 1, wherein the threshold voltage is between 5-50V.

4. The resonant power converter of claim 1, wherein the threshold voltage is between 10-25V.

5. The resonant power converter of claim 1, wherein the inductor comprises a non-linear inductor.

6. The resonant power converter of claim 1, wherein the resonant auxiliary switching circuit comprises an integrated circuit in a single package.

7. The resonant power converter of claim 1 wherein the resonant power converter is used in an active filter.

8. The resonant power converter of claim 5, wherein the non-linear inductor is an inductor comprising magnetic material adapted to become magnetically saturated after an amount of current has flowed through the inductor.

9. The resonant power converter of claim 5, wherein the non-linear inductor has inductance in its linear region in the range 1-10 µH.

10. The resonant power converter of claim 5, wherein the non-linear inductor has inductance in its linear region in the range 3-7 µH.

11. The resonant power converter of claim 8, wherein the magnetic material is an iron core of the inductor.

\* \* \* \* \*